US006983760B2

(12) United States Patent
Lee

(10) Patent No.: US 6,983,760 B2
(45) Date of Patent: Jan. 10, 2006

(54) VANED SPOOL TYPE DIRECTIONAL CONTROL VALVE AND FOUR-WAY REVERSIBLE VALVE FOR COOLING CYCLE SYSTEM USING THE SAME

(75) Inventor: Yun Boon Lee, Incheon (KR)

(73) Assignee: Aser Tech Co., Ltd., Seoul (KR)

( * ) Notice: Subject to any disclaimer, the term of this patent is extended or adjusted under 35 U.S.C. 154(b) by 0 days.

(21) Appl. No.: 10/482,955

(22) PCT Filed: Feb. 24, 2003

(86) PCT No.: PCT/KR03/00366

§ 371 (c)(1),
(2), (4) Date: Jan. 8, 2004

(87) PCT Pub. No.: WO03/071851

PCT Pub. Date: Sep. 4, 2003

(65) Prior Publication Data

US 2004/0182458 A1   Sep. 23, 2004

(30) Foreign Application Priority Data

Feb. 27, 2002  (KR) ................ 10-2003-0010377
Dec. 11, 2002  (KR) ................ 10-2002-0078674
Feb. 19, 2003  (KR) ................ 10-2002-0010527

(51) Int. Cl.
  *F16K 5/00*   (2006.01)
(52) U.S. Cl. ..................... 137/375; 251/59
(58) Field of Classification Search ......... 251/59; 137/375
See application file for complete search history.

(56) References Cited

U.S. PATENT DOCUMENTS

| 2,853,099 | A | * | 9/1958 | Eitel ...................... 251/59 |
| 4,150,695 | A |   | 4/1979 | Kosugui |
| 4,245,671 | A |   | 1/1981 | Kosugui |
| 4,469,134 | A |   | 9/1984 | Kanai et al. |
| 4,492,252 | A |   | 1/1985 | Kanai |
| 4,655,252 | A |   | 4/1987 | Krumhansl |
| 6,021,998 | A | * | 2/2000 | Stevenson ............... 251/59 |
| 6,192,937 | B1 |   | 2/2001 | Fagerlie et al. |
| 6,325,102 | B1 |   | 12/2001 | Misumi et al. |
| 6,830,073 | B2 | * | 12/2004 | Lee ..................... 137/625.43 |

FOREIGN PATENT DOCUMENTS

| EP | 0 102 884 | 3/1984 |
| JP | 52-67857 | 6/1977 |
| JP | 11-287535 | 10/1999 |
| JP | 11-325634 | 11/1999 |

* cited by examiner

*Primary Examiner*—John Fox
(74) *Attorney, Agent, or Firm*—Leydig, Voit & Mayer, Ltd.

(57) ABSTRACT

A vaned spool type directional control valve used to change a direction of motion of an actuator in an air pressure or oil hydraulic circuit includes a vaned spool having a valve portion and a vane portion integrally formed on a spool shaft. A chamber including a shaft support portion, a valve room, and a vane room is formed corresponding to the vaned spool. Main ports connected to the valve room in the chamber and two vane ports penetrating the opposed sides of the vane room are formed in the directional control valve. The directional control valve is of a pilot operated type so that flow of fluid in a main circuit can be changed by rotating the vane spool using the pressure of a pilot fluid.

19 Claims, 16 Drawing Sheets

VANED SPOOL TYPE DIRECTIONAL CONTROL VALVE AND FOUR-WAY REVERSIBLE VALVE FOR COOLING CYCLE SYSTEM USING THE SAME

BACKGROUND OF THE INVENTION

This application claims the priorities of Korean Patent Application No. 2002-10527 filed on Feb. 27, 2002, Korean Patent Application No. 2002-78674 filed on Dec. 11, 2002, and Korean Patent Application No. 2003-10377 filed on Feb. 19, 2003, in the Korean Intellectual Property Office, the disclosure of which, is incorporated herein in their entirety by reference.

1. Field of the Invention

The present invention relates to a vaned spool type directional control valve and a four-way reversible valve for a cooling cycle system using the same, and more particularly, to a directional control valve having a spool with a vane incorporated therein and operated in an internal or external pilot method, in which a pilot valve for the operation of the spool is incorporated into a valve main body, and to an application of the same which can be used as a solenoid-pilot operated control valve.

2. Description of the Related Art

A valve changing or stopping the direction of motion of an actuator such as an air cylinder or an oil hydraulic motor in an air pressure or oil hydraulic circuit is referred to as a directional control valve or simply a control valve. According to the type of a spool, the directional control valve is classified into a rotary spool type in which a spool rotates around an axis and a slide spool type in which a spool reciprocates along an axial direction. Also, according to the operation type of the spool, the directional control valve is classified into a manual type in which a spool is directly manipulated using a lever or handle, a mechanical type in which a spool is engaged by a moving cam, a solenoid type using a solenoid thrust of a solenoid, a pilot operated type using compressed air or oil, and an solenoid pilot operated type in which the solenoid type and the pilot operated type are combined.

Among the above various types, the solenoid type is easy to control in a remote control, automatic control, and emergency stop. However, since the solenoid type directly moves the spool by thrust of a solenoid, a solenoid having a large capacity is needed for the change of motion of a large amount of fluid. In contrast, the pilot operated type can change the flow of a large amount of fluid in a main circuit using the same pressure necessary to change the flow of a small amount of fluid. Thus, the solenoid-pilot operated control type combining the solenoid type and the pilot operated type is easy to control and capable of changing the flow of a large amount of fluid with a small solenoid so that it is one of directional control valves most widely used. The pilot method of the solenoid-pilot operated control type is classified into an external pilot type taking fluid from an additional circuit not a main circuit and an internal pilot type taking fluid from the main circuit. The internal pilot type is mainly adopted. The solenoid-pilot operated control type is disclosed in U.S. Pat. Nos. 4,150,695, 4,245,671, 6,192,937, and 6,325,102. According to these patents, a conventional solenoid-pilot operated control valve is made of a combination of a separated solenoid control type and a pilot operated control type. That is, the solenoid control valve is used as a pilot valve and the pilot operated control valve is used a as main valve. Also, the main valve is usually a slide spool type.

Meanwhile, U.S. Pat. Nos. 4,469,134 and 4,492,252 disclose a four-way reversible valve, as a sort of a solenoid-pilot control valve, used for a cooling cycle system such as a heating/cooling heat pump air conditioner. The principle and structure of the four-way reversible valve are the same as those used for a common air pressure or oil hydraulic circuit, but different in that a metal casing considering an environment of a high temperature and high pressure two-phase refrigerant is used and the casing is connected to a circuit by welding a refrigerant pipe thereto.

As is well known, the cooling/heating heat pump air conditioner has a mechanism of transfer of heat during the cycle of compression-condensation-expansion-evaporation of refrigerant. Cool airflow needed for cooling and hot airflow needed for heating are generated through heat exchange during the condensation and evaporation cycles. The cooling operation and heating operation is selected by switching the positions of heat exchangers, that is, a condenser and an evaporator, respectively used in the condensation and evaporation cycles. However, since the switch of the positions of the condenser and the evaporator is practically impossible, the flow of refrigerant in the condenser and the evaporator is changed by using a four-way reversible valve which is one of directional control valves.

The rotary spool type of the directional control valves is typically difficult to control because pressure on a circumference of a spool is not balanced and a lateral pressure increases under a high pressure. Thus, the rotary spool type is not appropriate for a high pressure use. Also, since the changing speed in the rotary spool type is slow and the rotary spool type is appropriate for a manual type, the application of the rotary spool type is limited.

The slide spool type is advantageous in that, compared to the rotary spool type, pressure is well balanced and the lateral pressure applied to the spool is small so that the switching is easily and quickly performed and pressure being used is high. However, since a lot of valve members are needed due to the structure of the slide spool and a gap between each valve member and a body is generated, affecting the leakage of liquid, so that a fine process is needed. This is because the valve body of a slide spool type is manufactured in a complicated post-processes after aluminum die casting so that manufacture thereof is difficult and the cost is high.

The solenoid-pilot control valve which has been frequently used is a slide spool type and has a structure of coupling a separate pilot valve to a main valve using a bolt. Accordingly, since seal to prevent leakage between valves and valve members such as a piston head to transfer the pressure of fluid by the pilot valve are added, the number of leakage points increases accordingly and malfunction is frequent so that the cost of the valve increases, which prevents supply of the valve at a low cost.

Also, the conventional slide spool type solenoid-pilot control valve has a structure in which a solenoid is connected in the axial direction of the spool so that the entire length of the valve increases and a large space is required. This problem is highlighted in a dual solenoid type.

Meanwhile, in the four-way reversible valve which is a sort of a solenoid-pilot control valve, in order to connect a pilot valve to a main valve in an internal pilot type, the four-way reversible valve is not directly connected and an additional capillary tube is additionally welded. That is, manufacture of the valve is difficult due to numerous welding points and the number of defective valves due to welding increases.

SUMMARY OF THE INVENTION

To solve the above and/or other problems, the present invention provides a vaned spool type directional control valve having an improved structure compared to the rotary spool type and the slide spool type. Also, the present invention provides a solenoid-pilot control valve and a cooling cycle four-way reversible valve, using the vaned spool type directional control valve, in which a pilot valve for the operation of a spool is incorporated with a main valve so that the structure thereof is simplified, the number of leakages and defective factors are decreased, a low price and a wide distribution are available.

According to one aspect of the present invention, there is provided a vaned spool type directional control valve comprising a vaned spool including a spool shaft, a valve portion extending from one side of the spool shaft, and a vane portion extending from the other side of the spool shaft, and a valve main body, a plurality of main ports through which fluid passes via the valve room of the chamber, and two vane ports through which pilot fluid passes formed at the opposed sides of the vane room of the chamber. The valve main body includes a chamber which includes a shaft support portion rotatably supporting the spool shaft, a valve room extending from one side of the shaft support portion and accommodating the valve portion of the vaned spool so that the valve portion rotates and moves in a sealed state, and a vane room extending from the other side of the shaft support portion and accommodating the vane portion of the vaned spool so that the vane portion rotates and moves in a sealed state. The vaned spool is rotated by pressure of the pilot fluid passing through the vane port.

The vaned spool type directional control valve is made of a solenoid-pilot operated type including one or two solenoid-pilot valves taking some of fluid supplied from one of the main ports and changing flow of the fluid with respect to the vane port.

According to another aspect of the present invention, there is provided a vaned spool type directional control valve comprising a vaned spool including a spool shaft, a valve portion extending from one side of the spool shaft, and a vane portion extending from the other side of the spool shaft, a valve main body, a valve casing accommodating the valve main body in a fixed state, forming a seal, and having a plurality of main ports connected to the main port connection holes and a plurality of refrigerant connection pipes for the connection of refrigerant pipes corresponding to the main ports, and a pilot valve unit taking some of the refrigerant supplied from one of the main ports and changing flow of the refrigerant with respect to the vane port. The valve main body includes a chamber which includes a shaft support portion rotatably supporting the spool shaft, a valve room extending from one side of the shaft support portion and accommodating the valve portion of the vaned spool so that the valve portion rotate and move in a sealed state, and a vane room extending from the other side of the shaft support portion and accommodating the vane portion of the vaned spool so that the vane portion rotate and move in a sealed state, a plurality of main ports connection holes through which fluid passes via the valve room of the chamber, and two vane ports through which pilot fluid passes formed at the opposed sides of the vane room of the chamber.

BRIEF DESCRIPTION OF THE DRAWINGS

The above and other features and advantages of the present invention will become more apparent by describing in detail preferred embodiments thereof with reference to the attached drawings in which:

FIGS. 22A and 22B are views illustrating the valve operation of the four-way reversible valve shown in FIG. 18.

DETAILED DESCRIPTION OF THE INVENTION

Figure 1:
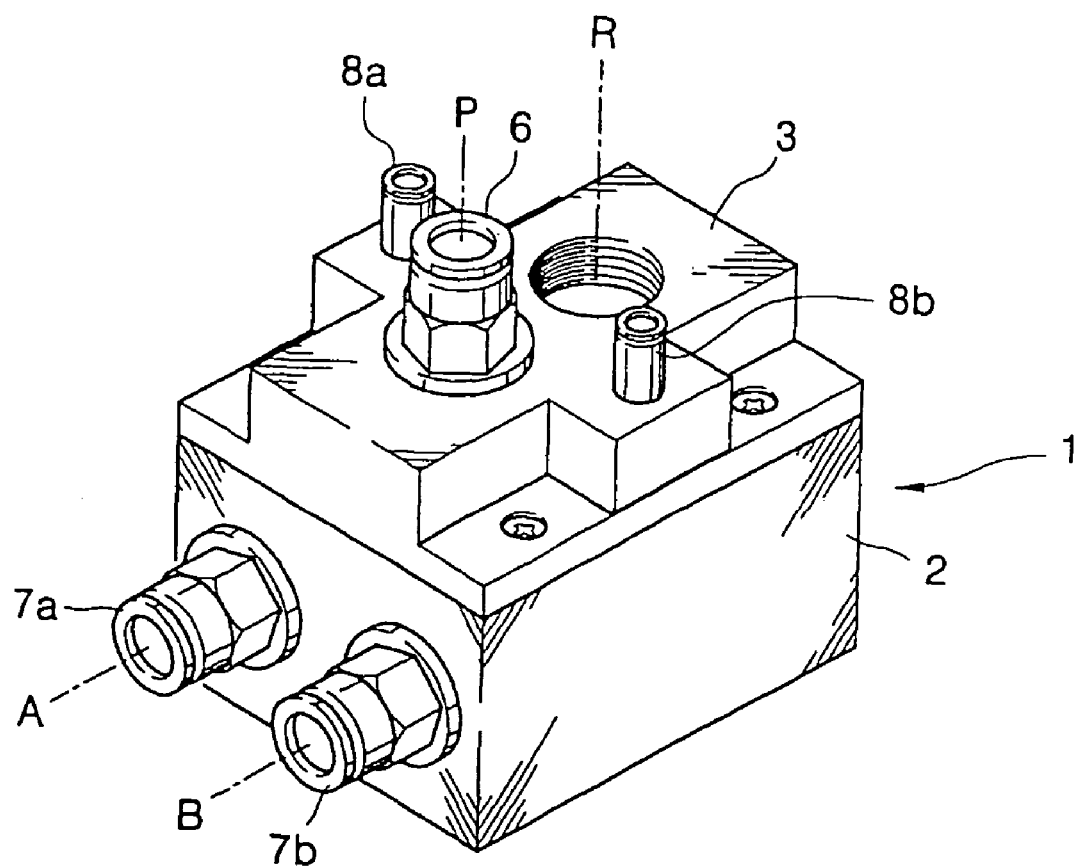
FIG. 1 is a perspective view illustrating a vaned spool type directional control valve in a pilot operated type according to a preferred embodiment of the present invention.

In the attached drawings, the same reference numerals are used for the same or corresponding parts.

FIGS. 1 through 7B show a vaned spool type directional control valve configured in an air pressure 2-position, 4-port pilot operated type according to a preferred embodiment of the present invention. Referring to FIG. 1, a valve main body 1 includes a main body block 2 and a main body cover 3 coupled to the upper surface of the main body block 2 by bolts. Of four main ports, supply port P and exhaust port R are formed at the main body cover 3 while load ports A and B are formed at the front surface of the main body block 2. Vane ports 36a and 36b through which fluid operated as pilot to operate a spool enters and is exhausted is formed at the main body cover 3. Hose fittings 6, 7A, 7B, 8A, and 8B for the connection of an air pressure circuit are coupled by screws to the supply port P and the load ports A and B. Although the drawing shows that the exhaust port R is open, a muffler (not shown) is typically coupled thereto. The exhaust port R acts as a drain port in a case of an oil hydraulic use. In the present preferred embodiment, since a fitting for drain connection is installed instead of a muffler so as to be actually connected to a drain, the control valve according to the present invention can be used for an oil hydraulic use.

Figure 2:
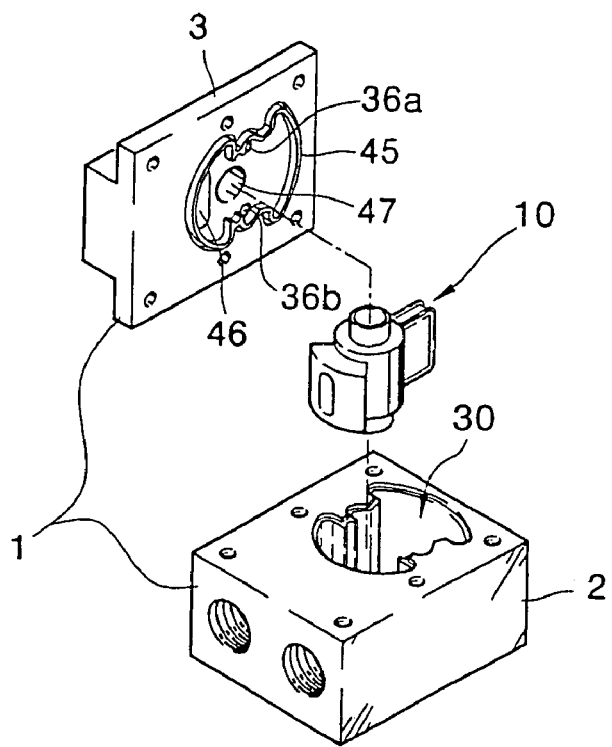
FIG. 2 is an exploded perspective view illustrating the control valve of FIG. 1.
Figure 3:
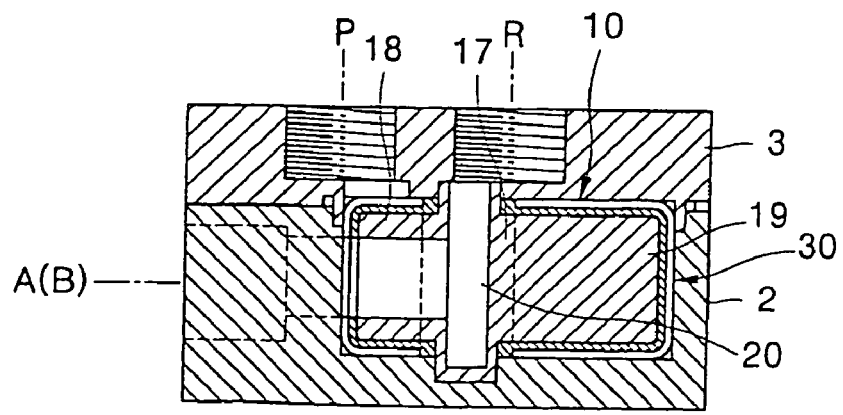
FIGS. 3 and 4 are a vertical sectional view and a horizontal sectional view, respectively, illustrating a vaned spool provided in the control valve shown in FIG. 1.

Referring to FIG. 2, a chamber 30 is formed in the main body block 2 of the valve main body 1. The vaned spool 10 is accommodated in the chamber 30 and the main body cover 3 covers the chamber 30 so as to be coupled to the main body block 2 using bolts.

Figure 5:
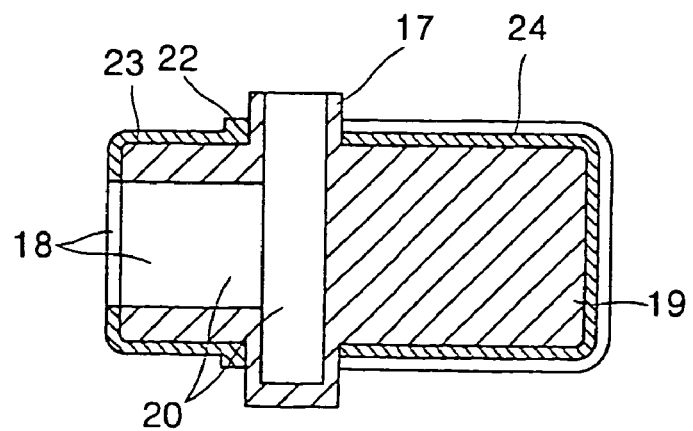
FIGS. 5 and 6 are respectively a vertical sectional view and a horizontal sectional view illustrating a vaned spool provided in the control valve shown in FIG. 1
Figure 6:
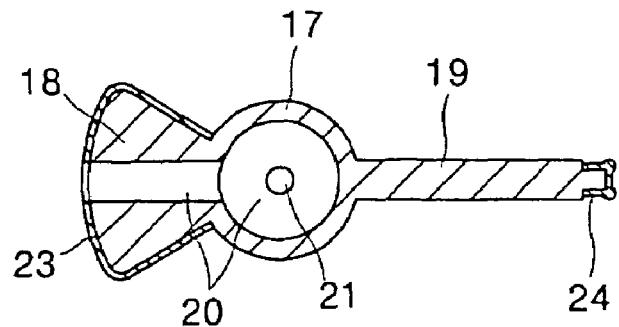

As shown in FIGS. 5 and 6, the vaned spool 10 includes a spool shaft 17, a valve portion 18 having a fan shape and extending from one side of the spool shaft 17, and a vane portion 19 having a plate shape and extending from the opposite side thereof. A groove 20 opened to the upper end portion of the spool shaft 17 and the tip end of the valve portion 18 is provided in the vaned spool 10 to provide an additional fluid path. The upper and lower end portions of the spool shaft 17 of the vaned spool 10, the surface of the valve portion 18, and the edge of the vane portion 19 are coated with rubber films 22, 23, and 24, respectively, so that a smooth sliding friction is possible while a seal with the respective portions in the chamber 30 in the valve main body is maintained.

Figure 4:
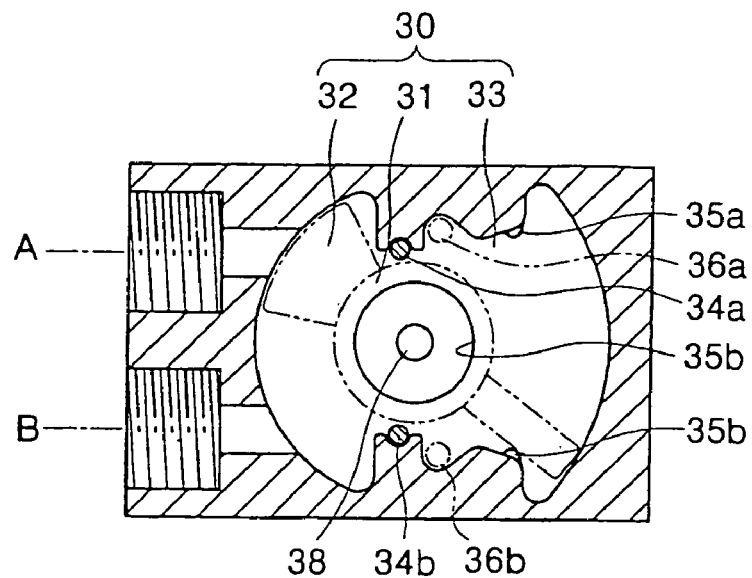

The chamber 30 of the main body block 2, as shown in FIG. 4, includes an axis support portion 31, a valve room 32 extended from one side of the shaft support portion 31, and a vane room 33 extending to the opposite side, corresponding to the respective parts of the vaned spool 10. The outer wall surfaces of the valve room 32 and the vane room 33 facing each other are circumferential surfaces of a coaxial circle with respect to the center of the shaft support portion 31. Seal members 34a and 34b having a rod shape inserted in the shaft support portion 31 contact the spool shaft 17 in an axial direction, maintaining a seal, so that the valve room 32 and the vane room 33 are separated into sealed spaces. The valve room 32 is formed so that the valve portion 18 of the vaned spool can rotate between two positions set within a range less than 180°, preferably, 90°. The load ports A and B penetrate the outer wall surface of the valve room 32 at the same height and at an interval therebetween in the circumferential direction. The supply port P at the side of the main body cover 3 is directly connected to the valve room 32 and the exhaust port R penetrates at the upper end surface of the spool shaft 17 at a position connected to the open portion of the groove 20 (referring to FIG. 3). The vane room 33 is used to act pressure of pilot fluid to move the vane portion 19 of the vaned spool in a range of angle corresponding to the set positions in the valve room 32. Fixed vanes 35a and 35b are provided in the vane room 33 at the opposed positions corresponding to both ends of the above angular range. The vane room 33 is separated by the vane portion 19 into two spaces and fluid can enter and be exhausted in the two opposed spaces through the two vane ports 36a and 36b penetrating the main body cover 3.

A seal 45 is provided to the main body cover 3, corresponding to an opening portion of the chamber 30 of the main body block. A supply hole 46 connecting the supply port P to the valve room 32 in the chamber 30 and an exhaust hole 47 supporting the upper end portion of the spool shaft 17 and connecting the groove 20 opened to the upper end portion of the spool shaft 17, to the exhaust port R, are formed in the main body cover 3.

Figure 7A:
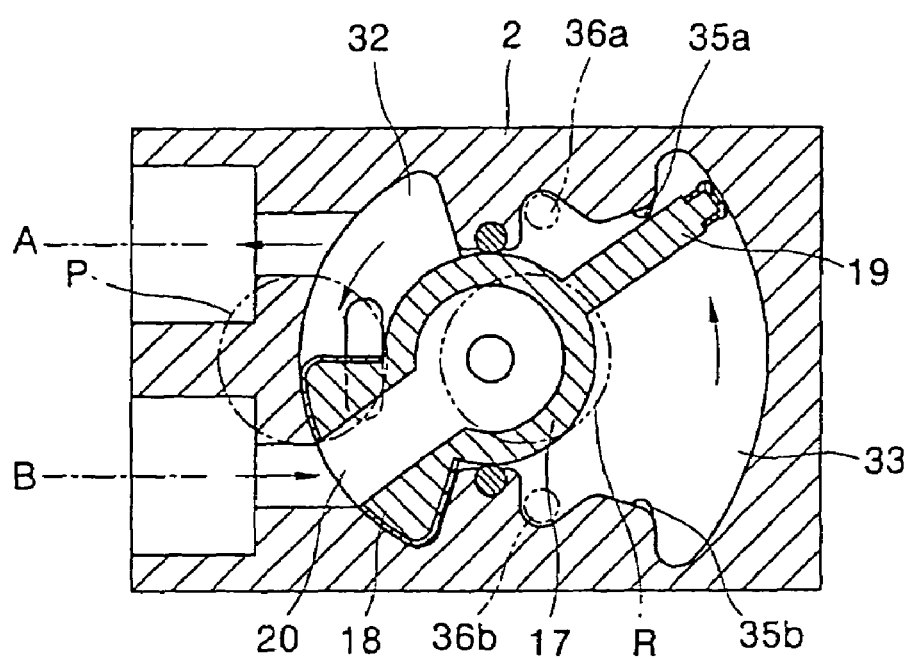
FIGS. 7A and 7B are horizontal views illustrating the operation state of the control valve shown in FIG. 1.
Figure 7B:
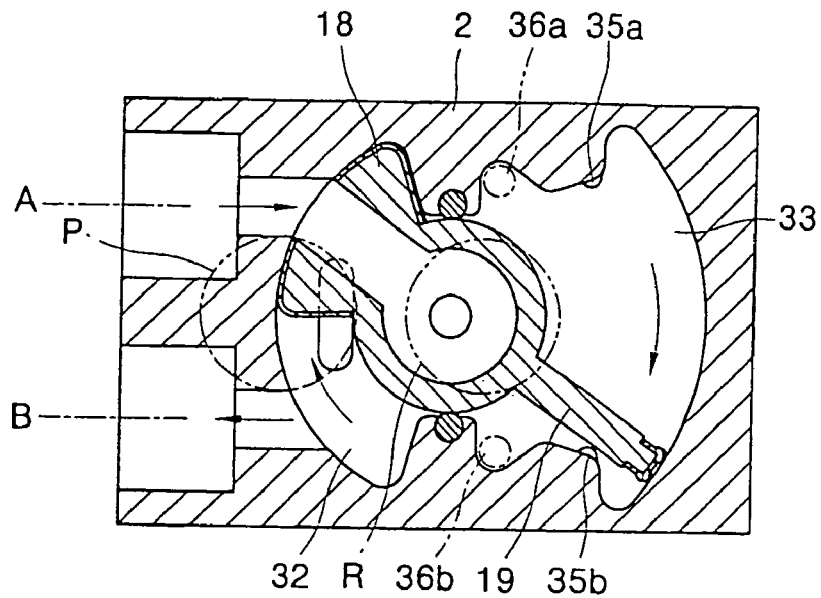

The directional control valve is of a pilot operated type and the operation state is shown in FIGS. 7A and 7B. The fluid acting as pilot can be typically taken from a main circuit or an additional circuit and supplied to the vane room 33 through one of the vane ports 36a and 36b and simultaneously the other space is kept in an exhaust state, so that the vaned spool 10 can be operated (rotated). That is, when pilot fluid is supplied to one side of the vane room 33 of the chamber 30 of the valve main body through one vane port 36b and the other vane port 36a is in an exhaust or collecting state, pressure of the pilot fluid flows in one side makes the vane portion 19 of the spool rotate counterclockwise until it leaves the fixed vane 35b at one side, contacts the fixed vane 35a at the opposite side, and is stopped thereby, as shown in FIG. 7A. Here, the fluid remaining at the opposite side is exhausted or collected to the outside through the vane port 36a. When the valve portion 18 is located at the end position in a counterclockwise direction as the vaned spool 10 rotates counterclockwise, the load port A of the two loads ports penetrating the wall surface of the valve room 32 in the chamber 30 is open so as to be connected to the supply port P. The load port B is blocked from the space in the valve room 32 by the valve portion 18 of the vaned spool so as to be connected to the exhaust port R through the groove 20 formed therein. In contrast, when the main port 36b is opened and simultaneously the pilot fluid is supplied through the other vane port 36a, as shown in FIG. 7B, the vaned spool rotates clockwise. Accordingly, the load port A is connected to the exhaust port R through the groove 20 of the spool by the valve portion 18 while the load port B is connected to the supply port P. When the two vane ports 36a and 36b are both closed or opened, the pressures of the pilot fluid acting in both side spaces, separated by the vane portion 19 of the vaned spool in the vane room 33 are identical so that the vaned spool 10 does not move, maintaining the present state.

In the present preferred embodiment, the number or position of the main ports can be appropriately changed according to the purpose of use, and the groove 20 of the vaned spool 10 is not necessary. For example, while the exhaust port R is sealed, a 3-port valve including the supply port P and the load ports A and B is available. This is applied not only to the present preferred embodiment but also to a preferred embodiment described later.

Figure 8:
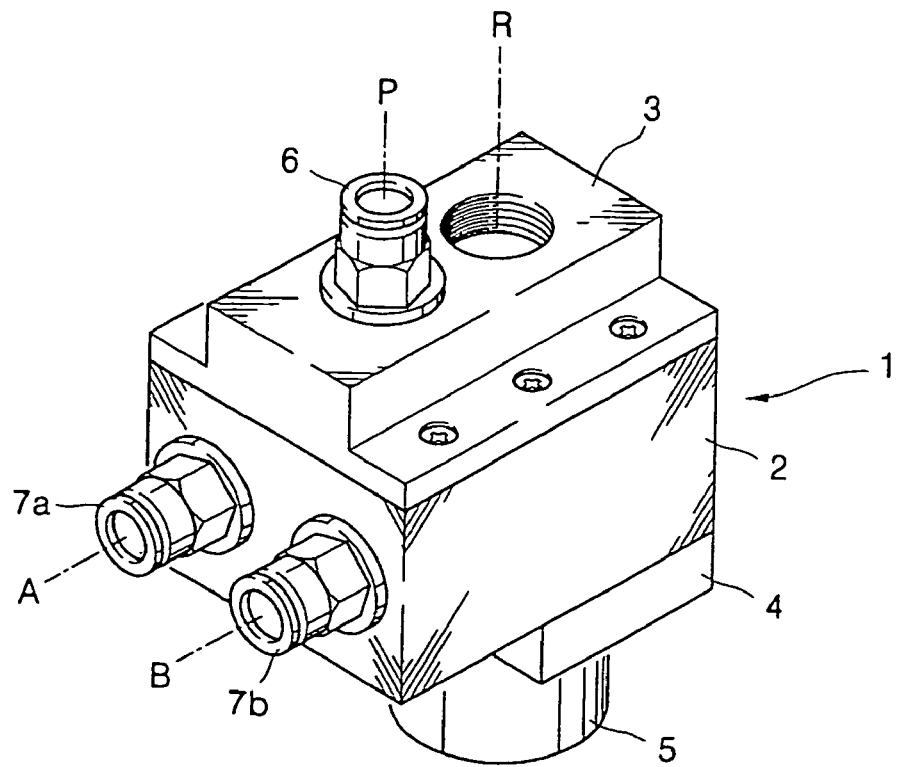
FIG. 8 is a perspective view illustrating a vaned spool type directional control valve configured in a solenoid-pilot operated type according to a preferred embodiment of the present invention.

FIGS. 8 through 15B show a vaned spool type directional control valve configured in a solenoid-pilot operated type according to a preferred embodiment of the present invention. It is a characteristic feature of the present preferred embodiment that a pilot-valve is incorporated into a valve main body unlike the general air pressure or oil hydraulic type. That is, referring to FIG. 8 showing the outer appearance of the control valve, the valve main body 1 includes the main block 2, the main body cover 3 disposed at the upper surface of the main body block 2, and a pilot valve bracket 4 disposed at the lower surface of the main body block 2. Of the four main ports, the supply port P and the exhaust port R are formed at the main body cover 3 and the load ports A and B are formed at the front surface of the main body block 2. A solenoid mechanism 5 driven by an electric signal for the operation of the pilot valve is integrally coupled to the pilot valve bracket 4. Fittings 6, 7A, and 7B for connection of an air pressure circuit are coupled to the supply port P and the load ports A and B. The present preferred embodiment can be used for an oil hydraulic use like the above-described preferred embodiment.

Figure 9:
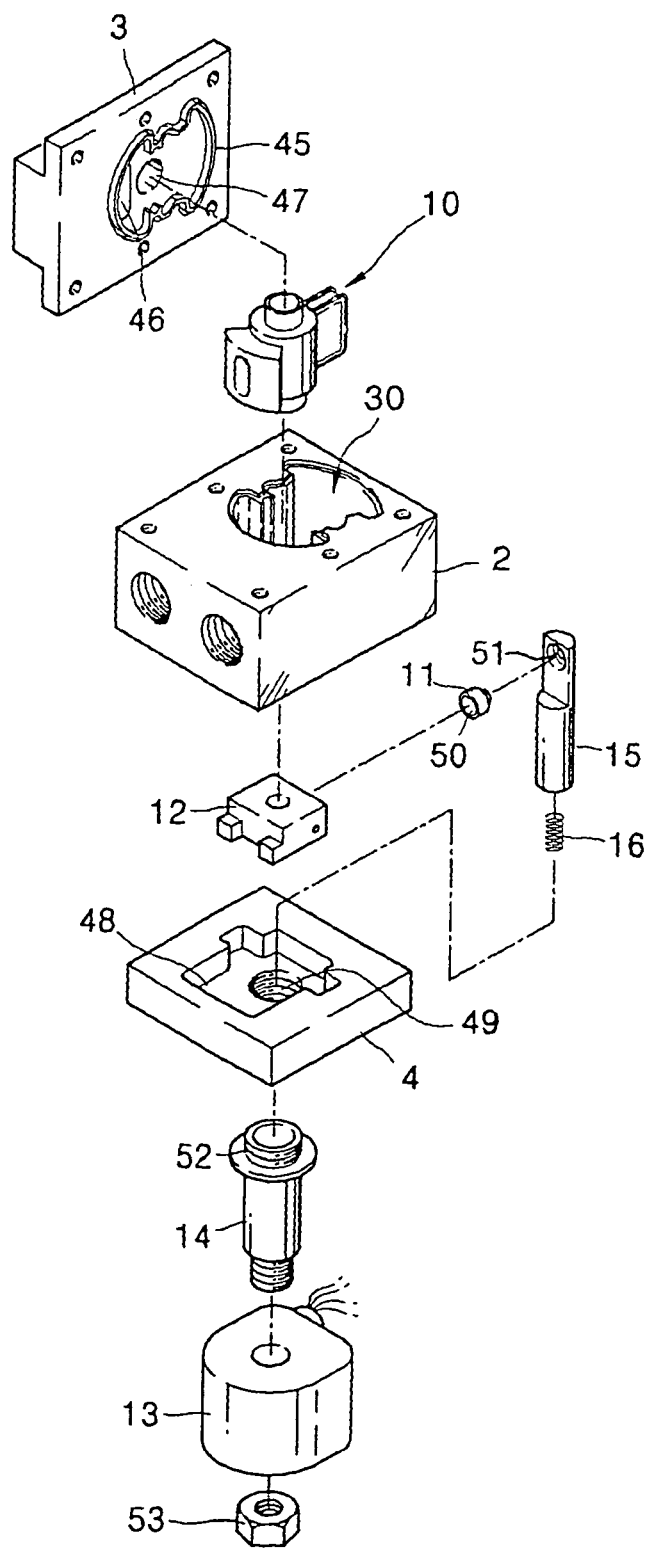
FIG. 9 is an exploded perspective view illustrating the control valve shown in FIG. 8.
Figure 10:
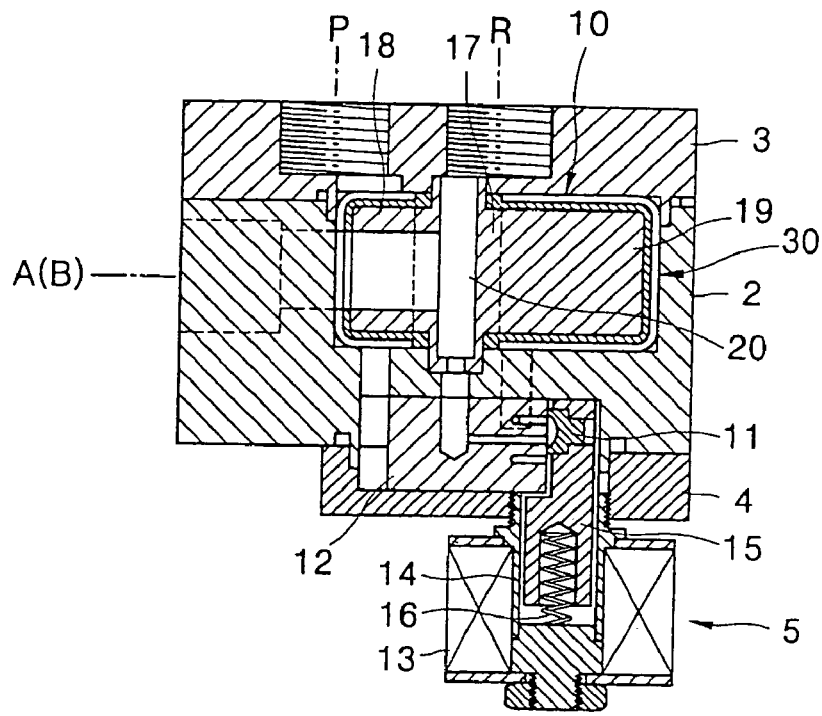
FIGS. 10 and 11 are a vertical sectional view and a horizontal sectional view, respectively, illustrating the control valve shown in FIG. 8.
Figure 11:
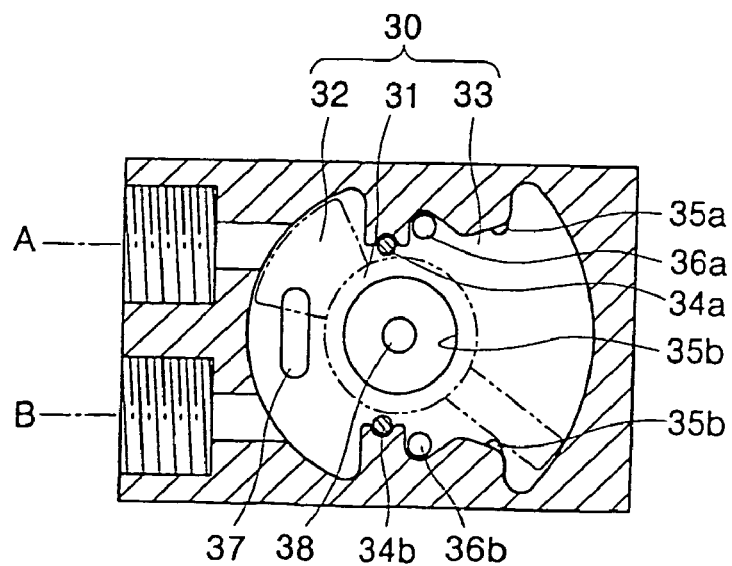

The directional control valve according to the present preferred embodiment, as shown in FIGS. 9 and 10, includes the valve main body 1 having the main body block 2, the main body cover 3, and the pilot valve bracket 4, the vaned spool 10, a pilot valve cup 11 and a valve seat block 12, and a solenoid mechanism for the operation of the pilot valve cup 11 having a solenoid coil 13, a stem 14, a plunger 15, and a spring 16.

Figure 12:
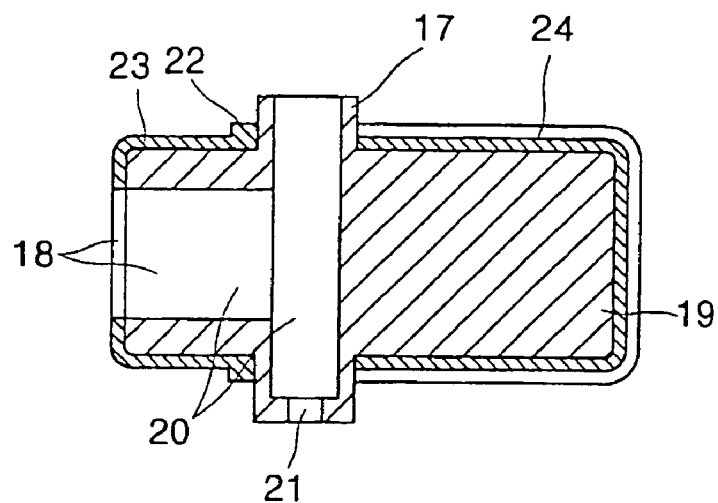
FIG. 12 is a horizontal sectional view illustrating a vaned spool provided to the control valve shown in FIG. 8.

The vaned spool 10 has the same structure as that in the above-described preferred embodiment. In the present preferred embodiment, as shown in FIG. 12, the vaned spool 10 further includes a pilot exhaust guide hole 21 penetrating a lower end surface of the spool shaft 17 and connected to the groove 20.

The basic structure of the main body block 2 is the same as that in the above-described preferred embodiment. In the present preferred embodiment, the vane ports 36a and 36b penetrate the bottom of the vane room of the main body block 2 and further includes a pilot supply hole 37 penetrating the bottom of the valve room 32 of the chamber 30 and the pilot exhaust hole 38 penetrating the center of the bottom of the shaft support portion 31 and connected to the pilot exhaust guide hole 21 formed in the vaned spool 10.

Figure 13:
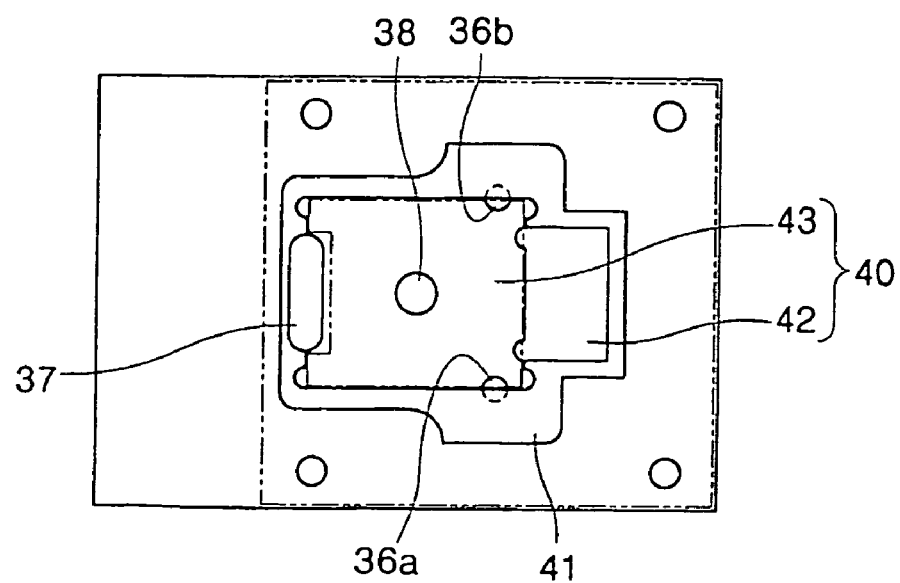
FIG. 13 is a bottom view of the control valve shown in FIG. 8.

The main body block 2, as shown in FIG. 13, has a pilot valve room 40 provided on the bottom thereof. The pilot valve room 40 is encompassed by a rib 41 protruding from the bottom of the main body block and is divided into a valve accommodation portion 42 for accommodating the pilot valve cup 11 and a block accommodation portion 43 for accommodating the valve seat block 12. The two vane ports 36a and 36b, the pilot supply hole 37, and the pilot exhaust hole 38 penetrate the block accommodation portion 43 of the pilot valve room 40.

Figure 14:
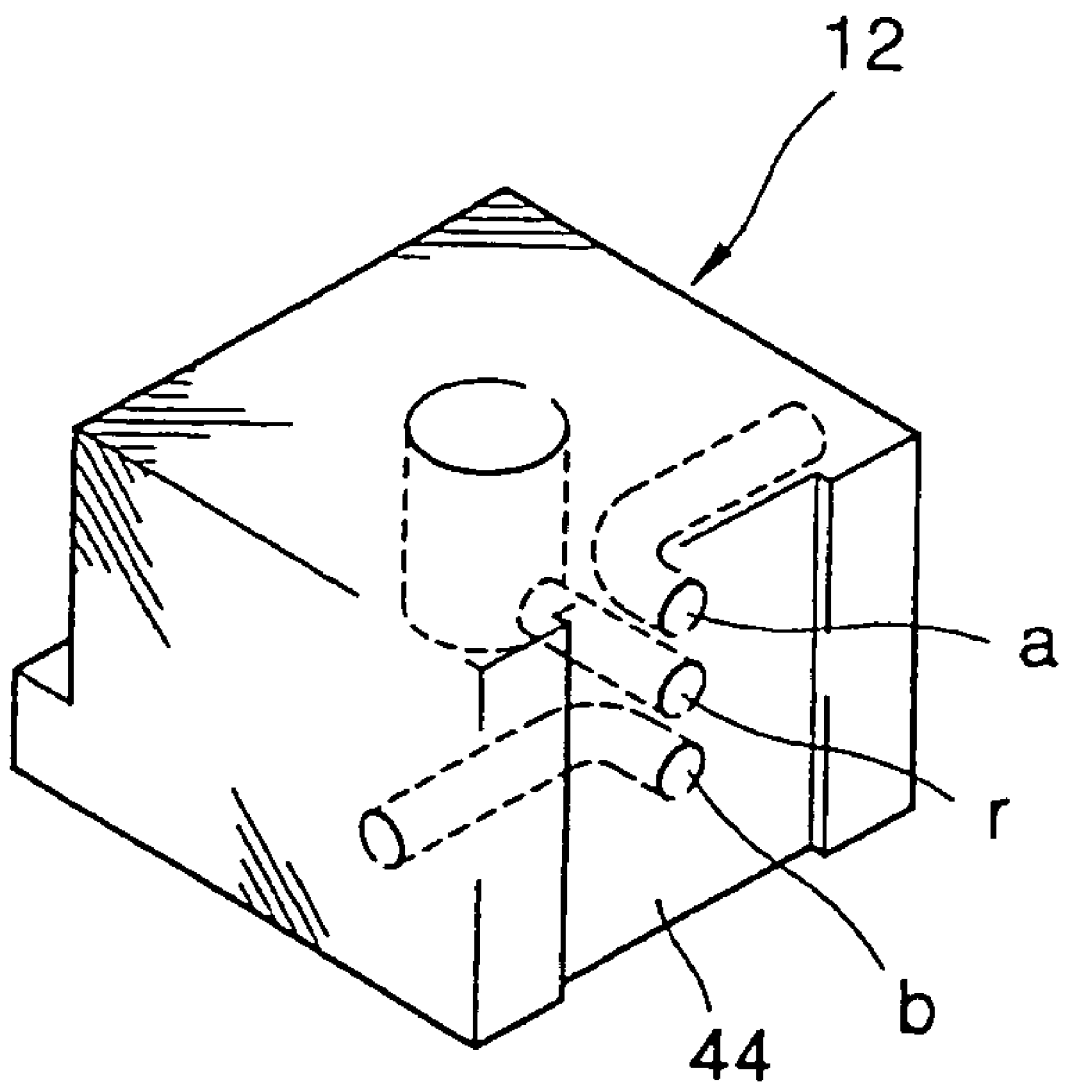
FIG. 14 is a perspective view illustrating a valve seat block provided to the control valve shown in FIG. 8.

The valve seat block 12 accommodated in the block accommodation portion 43 of the pilot valve room 40 provides a valve seat of the pilot valve cup 11 and has a flat valve seat surface 44 at one side surface, as shown in FIG. 14. Three pilot ports of load ports a and b and an exhaust port r are formed in the valve seat block 12. The ports a and b are open to the opposed side surfaces and connected to the vane ports 36a and 36b, respectively, while the exhaust port r is connected to the pilot exhaust hole 38 and the pilot exhaust guide hole 21 of the vaned spool 10 and finally connected to the exhaust port R of the main port via the groove 20 of the vaned spool 10.

The pilot valve bracket 4 is coupled to the main body block 2 forming a seal and corresponds to the shape of the rib 41 forming the pilot valve room 40 on the bottom of the main body block. The pilot valve bracket 4 includes a recess 48 forming a space portion so that the fluid flowing in through the pilot supply hole 37 can smoothly flow toward the valve accommodation portion 42 and a threaded hole 49 to which the stem 14 of the solenoid mechanism is coupled.

The pilot valve cup 11 connects two neighboring ports of the three pilot ports by encompassing the ports. The plunger 15 of the solenoid mechanism to move the pilot valve cup 11 has a cup support groove 15 to which the pilot valve cup 11 is inserted so as to support the pilot valve cup 11. The plunger 15 is inserted in the stem 14 with the spring 16. The stem 14 is coupled to the threaded hole 49 of the pilot valve bracket 4 by a threaded portion 52 at the tip portion thereof.

The coil 13 molded with resin is inserted around the stem 14 and coupled by a nut 53. The plunger 15 is pulled downward compressing the spring 16 by an electronic thrust generated during excitation of the coil 13. When the excitation current is cut off, the plunger 15 returns to its original state by an elastic force of the spring 16 which is compressed, so that the pilot valve cup 11 in contact with the seat surface 44 of the is 5 valve seat block 12 is moved with respect to the pilot ports. Here, the pilot valve cup 11 closely covers and connect upper or lower two neighboring pilot ports of the three pilot ports while opening one port. The fluid coming in through the pilot supply hole 37 is supplied through the open pilot port.

Figure 15A:
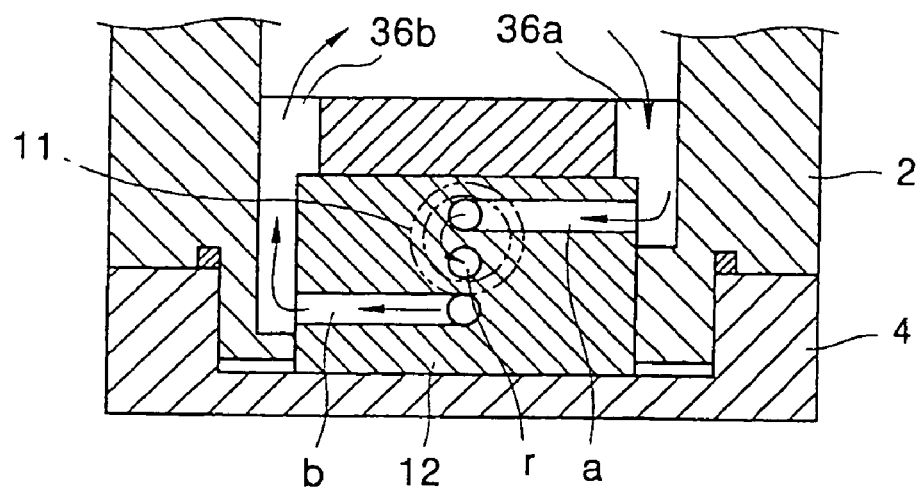
FIGS. 15A and 15B are sectional views illustrating part of the pilot control operation of the control valve shown in FIG. 8.

The above-described control valve is operated by supplying or cutting an excitation current of the solenoid coil. While the excitation current of the coil is cut-off, as shown in FIG. 15A, the pilot valve cup 11 ascends and two of the three pilot ports formed in the valve seat block 12, that is, the uppermost load port a and the exhaust port r are connected to each other by being closely covered by the pilot valve cup 11 and the lowermost load port b is exposed to the pilot valve room 40. Then, the fluid taken as a pilot use is supplied to the exposed load port b and flows into one side of the vane room 33 in the chamber 30 of the valve main body through the vane port 36b. The fluid remaining in the opposite side in the vane room 33 is exhausted outside via the vane port 36a and the load port a and the exhaust port r. This state continues during which the excitation current is cut off. In this state, the valve portion 18 of the vaned spool is operated as described with reference to FIG. 7A.

Figure 15B:
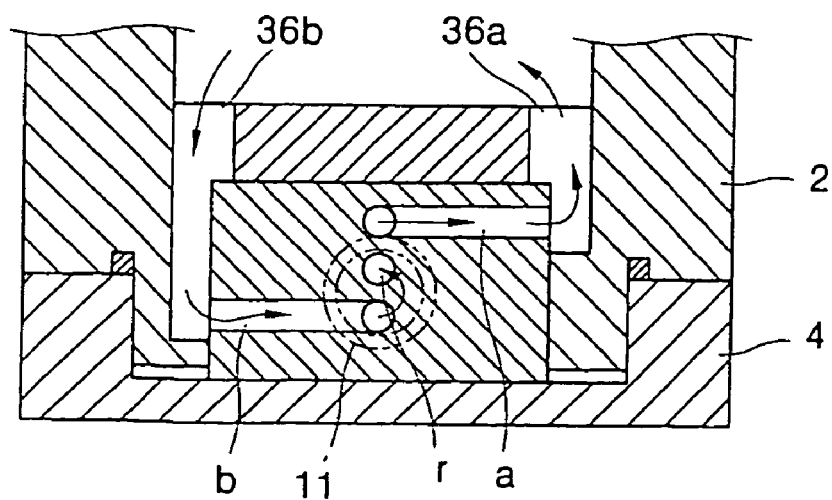

When the excitation current of the solenoid coil is applied, as shown in FIG. 15B, the pilot valve cup 11 descends and lower two ports of the three pilot ports, that is, the lowermost load port b and the exhaust port r, are closely covered by the pilot valve cup 11 which is lowered and connected to each other. The uppermost load port a is exposed to the pilot valve room 40 and through which fluid is supplied. The fluid is supplied to one side of the vane room 33 in the chamber of the main body block through the main port 36a at one side. The fluid remaining at the opposite side is exhausted to the outside through the vane port 36b, the load port b and the exhaust port r in this state, the valve portion 18 of the vaned spool is operated as described with reference to FIG. 7B.

The above operation is repeated at a supply/cut interval according to the supply/cut of the excitation current of the solenoid coil. Thus, by changing the flow of fluid with respect to the main ports A and B connected to an external actuator (not shown), the direction of a motion of the apparatus can be changed. When the excitation current of the solenoid is cut off due to a blackout or an emergency stop, the vaned spool is always kept in a normal state as shown in FIGS. 15 and 7A. Thus, the present preferred embodiment is appropriate for a case in which the actuator performs a certain work process and sopped or emergency stopped and then is needed to perform a designated work from a designated position.

Figure 16:
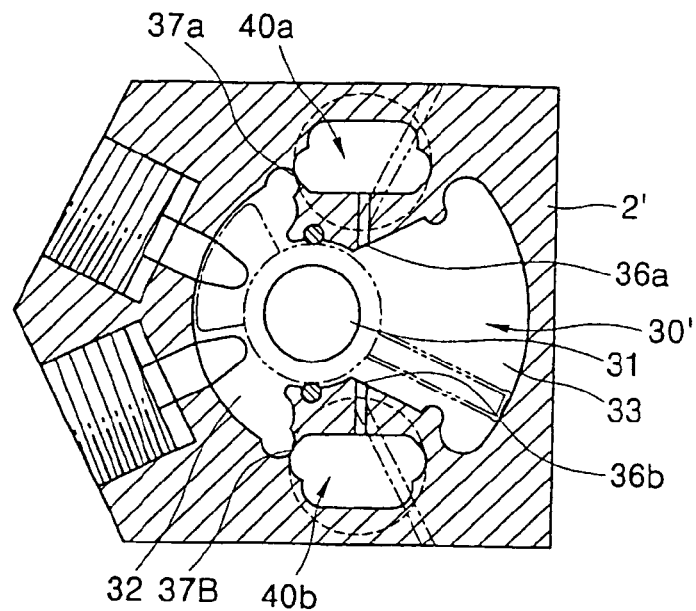
FIGS. 16 and 17 are a horizontal sectional view and a vertical sectional view, respectively, illustrating the inner structure of the vaned spool type directional control valve configured in a dual solenoid-pinot operated type according to a preferred embodiment of the present invention.
Figure 17:
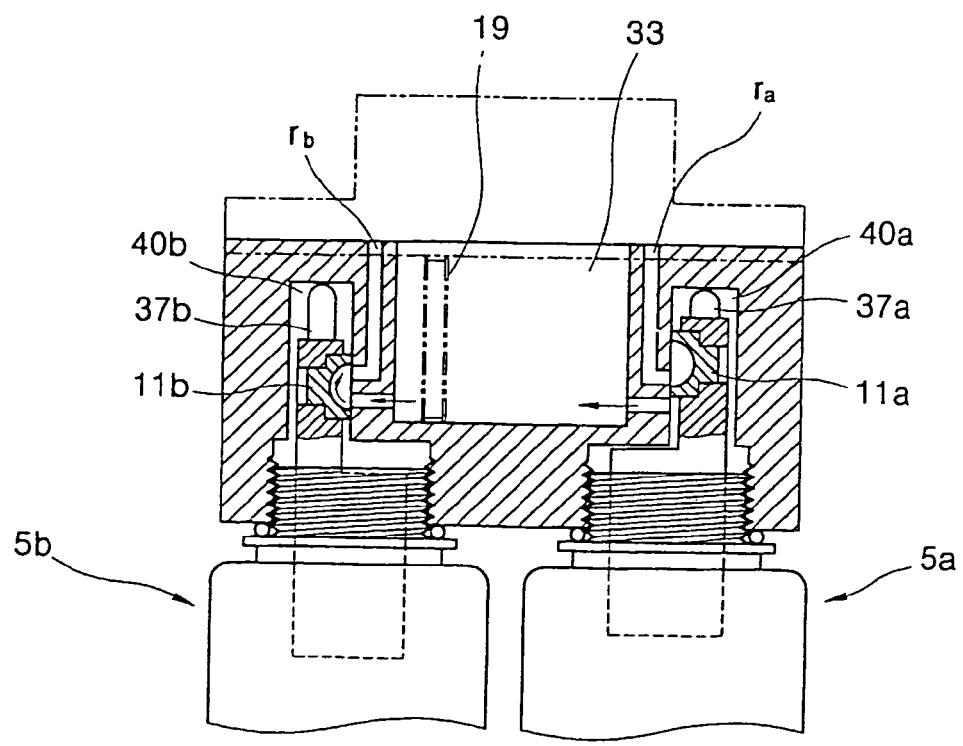
Figure 18:
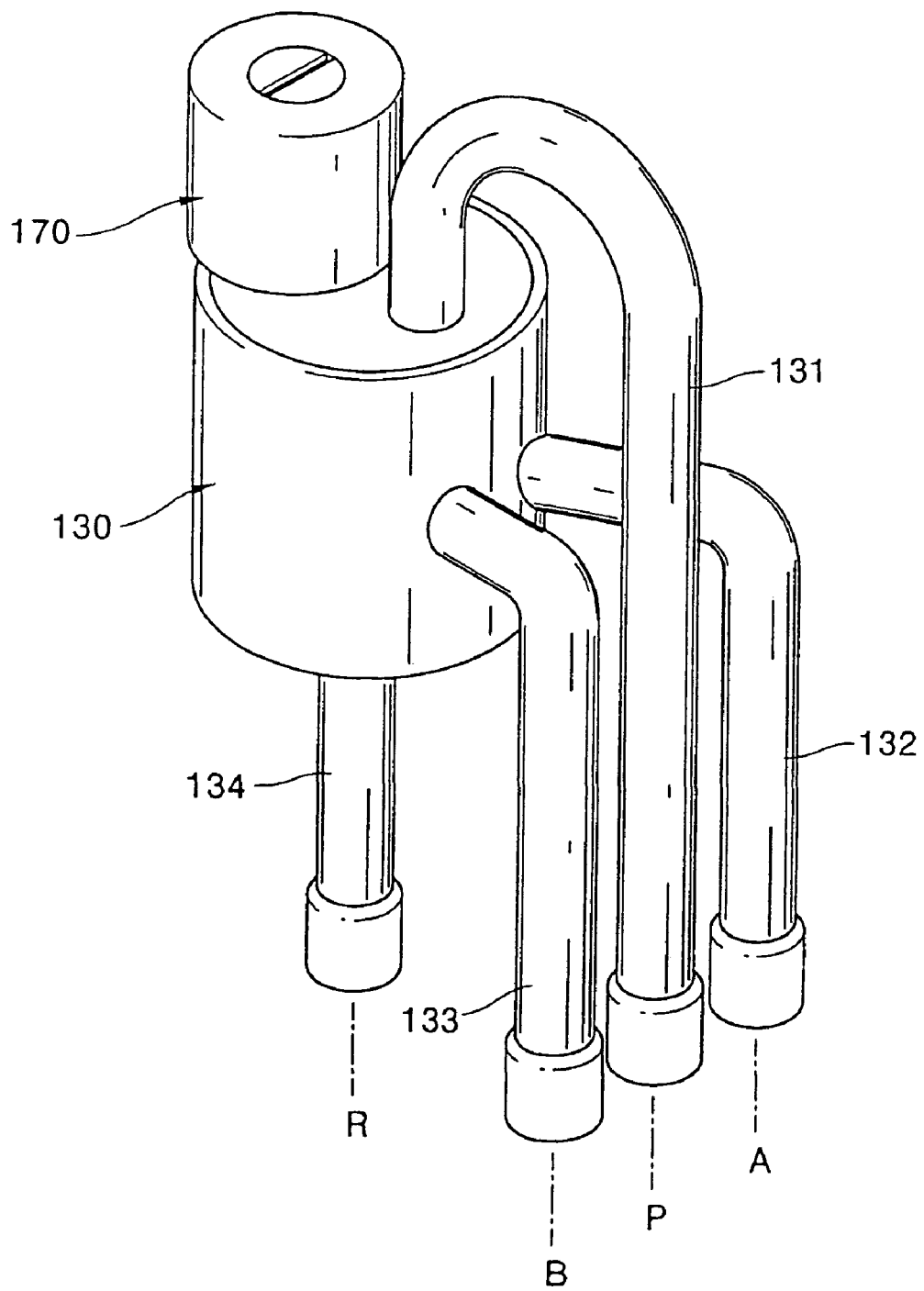
FIG. 18 is a perspective view illustrating a four-way reversible valve for a cooling cycle system using the vaned spool directional control valve according to a preferred embodiment of the present invention.

FIGS. 16 and 17 show the vaned spool type directional control valve configured in a dual solenoid-pinot operated type according to a preferred embodiment of the present invention. it is a characteristic feature of the present preferred embodiment that two solenoids are provided unlike the above-described preferred embodiments so that, in spite of blackout or emergency stop, the stopped work is instantly and continuously performed.

Two pilot valve rooms 40a and 40b are formed in the main body block 2 of the directional control valve according to the present preferred embodiment. Two pilot valve cups 11a and 11b are installed at two pilot valve rooms 40 and 40b, respectively, and two solenoid mechanisms 5a and 5b are provided to move the respective pilot valve cups 11a and 11b.

Seat surfaces 44a and 44b providing valve seats of the pilot valve cups 11a and 11b are integrally formed in the pilot valve rooms 40a and 40b. The vane ports 36a and 36b of the vane room 33 in the chamber 30 of the main body block penetrate the seat surfaces 44a and 44b, respectively, and exhaust ports ra and rb are formed adjacent to the seat surfaces 44a and 44b. The additional exhaust ports ra and rb proceed toward the upper surface of the main block 2 and turn to the side surface at the upper surface and are directly exposed to the outside. Pilot supply holes 37a and 37b are formed between one side of each of the pilot valve rooms 40a and 40b and the opposed end portions of the valve room 32 of the chamber 30 of the main block so as to be connected respectively.

The solenoids 5a and 5b are alternately operated by a control circuit which is not shown. FIG. 17 shows a state in which a signal to the solenoid 5a is cut off while a signal to the solenoid 5b is applied. In the pilot valve room 40a at the solenoid 5a where a signal is cut off, the pilot valve cup 11a ascends and the exhaust port ra is blocked so that the fluid can be supplied to the vane port 36a. In the pilot valve room 40b at the solenoid 5b where a signal is applied, the pilot valve cup 11b descends and the vane port 36b is connected to the exhaust port rb so as to be exhausted. Thus, the vane portion 19 of the vaned spool in the vane room 33 is moved from one side to the other side so that the position of the valve portion 18 is changed. When the signals to the solenoids are switched, the pilot valve cup 11a descends while the pilot valve cup 11b ascends so that the switching operation is reversed. When the signal is all cut off at any point due to blackout or emergency stop, both pilot valve cups 11a and 11b ascend so that exhaust ports ra and rb are blocked and the vane ports 36a and 36b are open. Then, the pressure of fluid acting in both pilot valve rooms 40a and 40b are balanced so that the pressure in both spaces divided by the vane portion 19 of the vaned spool in the vane room 33 of the main valve room are balanced. That is, at any position, the vane portion 19 is maintained to be fixed at the present position without movement. Therefore, in spite of a blackout or an -emergency stop, the current operation state of an actuator is maintained so that, when the operation is resumed, a work can be continuously performed from the point when the work is stopped.

Next, FIGS. 18 through 22A and 22B show a preferred embodiment of a four-way reversible valve for a cooling cycle system using the vaned spool type directional control valve according to the present invention. The type of a valve is the same as in the second preferred embodiment. The four-way reversible valve is from the consideration of an environment where refrigerant present in two phases at high temperature and high pressure is used. The directional control valve according to the present invention includes a cylindrical and firm valve casing 130. The valve casing 130 has coolant connection pipes 131, 132, 133, and 134, connected to the respective portions of an air conditioning system, for example, a compressor and respective coolant pipes of a heat exchanger, are welded at the respective ports and bent properly, corresponding to a supply port P formed at the upper surface thereof, two load ports A and B formed on an outer circumferential surface thereof, and a drain port R formed at the center of the lower surface thereof. A solenoid 170 is installed at the upper surface of the valve casing 130. The solenoid is operated to convert the valve by being excited by an electric signal. The electric signal is applied only when the heating operation of an air conditioning system is selected, but not applied when cooling operation is selected.

Figure 19:
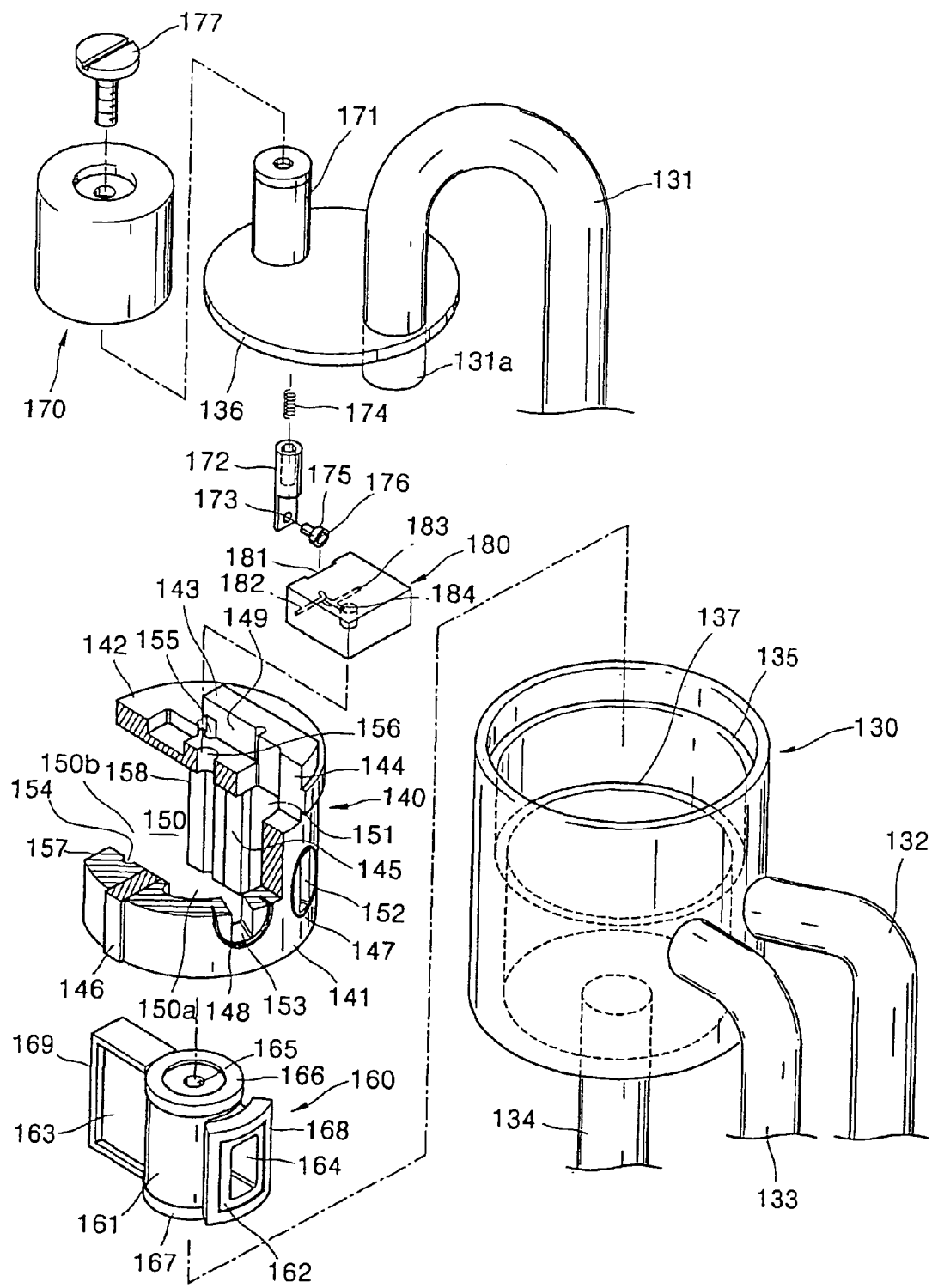
FIG. 19 is an exploded perspective view illustrating the four-way reversible valve shown in FIG. 18.

Referring to FIG. 19, the valve casing 130 is formed into a cup shape by processing metal such as brass. A cap 136 having a disc shape is capped on a hooking step 135 formed at the upper portion of the valve casing 130 and the edge of the cap 136 is welded to seal the cap 136. It is possible to screw together the valve casing 130 and the cap 136 with a separate sealing member so that they can be easily assembled and disassembled.

A valve main body 140 fixedly installed in the valve casing 130 is a mold formed by injecting engineering plastic, for example. The valve main body 140 includes a cylindrical body portion 141, a flange portion 142 at the upper portion of the body portion 141, and a block support portion 143 at the upper portion of the flange portion 142. The body portion 141 has a diameter slightly less than the inner circumferential surface of the valve casing 130, so that it can be easily inserted during assembly. The flange portion 142 has such a diameter as to tightly fit to the inner circumferential surface of the valve casing 130, so that it can be placed on a hooking step 137 formed on the inner circumferential surface of the valve casing 130 and fixed thereon. A cut-away portion 144 is formed at one side of the flange portion 142 and the block support portion 143 and accommodates an end portion 131a of a coolant connection pipe 131 penetrating the supply port P formed at the cap 136.

The valve main body 140 has a valve room 150a formed in the body portion 141 and a chamber 150 formed of the vane room 150b by extending the opposite side of the valve room 150a. The valve room 150a is connected to the coolant connection pipe 131 at the support port P through a main port connection hole 151 at the supply's side penetrating the cut-away portion 144 of the flange portion 142 above the valve room 150a. Also, the valve room 150a can be connected to each of the coolant connection pipes 132 and 133 at the side of load ports A and B through main port connection holes 152 and 153 at the load's side penetrating a wall surface of the body portion 141. The pilot hydraulic chamber 50b is formed by cutting the wall surface and bottom surface of the body portion 141 to secure a sufficient space and thus encompassed by the wall surface and bottom surface of the inner circumference of the valve casing 130 exposed thereto and fixed vanes 157 and 158 at both ends of the cut portion. Two pilot input ports 154 and 155 respectively formed along the wall surface at the side of the fixed vanes 157 and 158 and above the flange portion 142 penetrate the vane room 150b. A drain hole 156 of the vane room 150b penetrates the center of the flange portion 142 and is connected to a groove 164 of the vaned spool 160 which is described later.

The body portion 141 of the valve main body 140 is cut in a diametric direction between the valve room 150a and the vane room 150b and seal blocks 145 and 146 are inserted in the cut portion. The seal blocks 145 and 146 maintain sealing with respect to a spool shaft 161 of the vaned spool 160 which is described later by the inner end portions thereof and the inner circumferential surface of the valve casing 130 by the outer end portions thereof, so that the valve room 150a and the vane room 150b are separated into sealed spaces. Seal rings 147 and 148 installed around the main port connection holes 52 and 53 at the load's side on the outer circumferential surface of the body portion 141 in a half-embedded state closely contact the load ports A and B penetrating the inner circumferential surface of the valve casing 130 to maintain a sealing state. The seal blocks 145 and 146 and the seal rings 147 and 148 are formed of a material exhibiting a high mechanical and sealing feature, for example, Teflon based resin.

The vaned spool 160 is formed of a cylindrical spool shaft 161, a valve portion 162 extending from one side of the spool shaft 161 and accommodated in the valve room 150a, a vane portion 163 extending from the other side of the spool shaft 161 and accommodated in the vane room 150b, and a groove 164 formed from the end of the valve portion 162 to the lower end portion of the spool shaft 161. The groove 164 at the end of the valve portion 162 is connected to the load port A or B through one of the main port connection holes 152 and 153 at the load's side of the valve main body 140 and to the drain port R of the bottom of the valve casing 130 at the lower end portion of the spool shaft 161. Also, a drain hole 165 for connecting the drain hole 156 of the valve main body 140 to the groove 164 is formed by penetrating the upper end portion of the spool shaft 161 of the vaned spool 160.

Sealing rings 166 and 167 formed of Teflon-based resin are coupled to the upper and lower end portions of the spool shaft 161 of the vaned spool 160 to seal around the drain hole 165 penetrating the flange portion 142 of the valve main body 140 and around the drain portion R at the bottom of the valve casing 130. Seal members 168 and 169 formed of Teflon-based resin are coupled to the end portion of the valve portion 162 to maintain sealing with the inner circumferential wall surface at the side of the valve room 150a and to the edge of the vane portion 163 to maintain sealing with the ceiling of the vane room 150b and the inner circumferential wall surface and the bottom surface of the valve casing 130.

Next, as a pilot valve means, a pilot valve room 149 encompassed by the block support portion 143 on the flange portion 142 of the valve main body 140, the solenoid 170, a stem 171, a plunger 172, a pilot valve cup 175, and a valve seat block 180 are provided. The solenoid 170 is inserted around the stem 171 and fixed by a screw 177. An end portion of the stem 171 penetrates the cap 136 so that the stem 171 is fixedly welded on the cap 136 to erect thereon. The plunger 172 is inserted in the stem 171 together with a spring 174 and always protrudes toward a normal position in a spring offset manner. When the solenoid 170 is excited, the plunger 172 is pulled to a converting position by an electrical thrust. The pilot valve cup 175 is accommodated in a cup support groove 173 formed in an end portion of the plunger 172. The pilot valve cup 175 closely contacts a seat surface 181 of the valve seat block 180 and slides thereon and moves together with the plunger 172.

The valve seat block 180 accommodated on the pilot valve room 149 inside the block support portion 143 of the valve main body 140 is manufactured by processing metal such as brass and has three pilot port connection holes 82, 83, and 84 formed in the seat surface 181 which are open with an interval in a vertical direction, that is, in a direction in which the plunger 172 moves. The interval between two neighboring ones of the three pilot ports 182, 183, and 184 is less than the diameter of the pilot valve cup 175 and the length between the uppermost pilot port 182 and the lowermost pilot port 183 is greater than the diameter of the pilot valve cup 175. That is, when the pilot valve cup 175 is in a normal position, the lower two neighboring pilot ports 183 and 184 are connected by the pilot valve cup 175 and the uppermost pilot port 182 is exposed outside the pilot valve cup 175 (referring to FIG. 21). At the converting position, the upper two neighboring pilot ports 182 and 184 are connected by the cavity 177 of the pilot valve cup 175 and the lowermost pilot port 183 is exposed.

The two uppermost and lowermost pilot ports 182 and 183 of the pilot ports 182, 183, and 184 of the valve seat block 180 are connected to the two vane ports 154 and 155 formed in the valve main body 140 and the other pilot port 184 is connected to the drain hole 156.

In FIG. 5, reference numeral 138 denotes a concave groove to guide an assembly position when the valve main body 140 is assembled to the valve casing 130.

Figure 20:
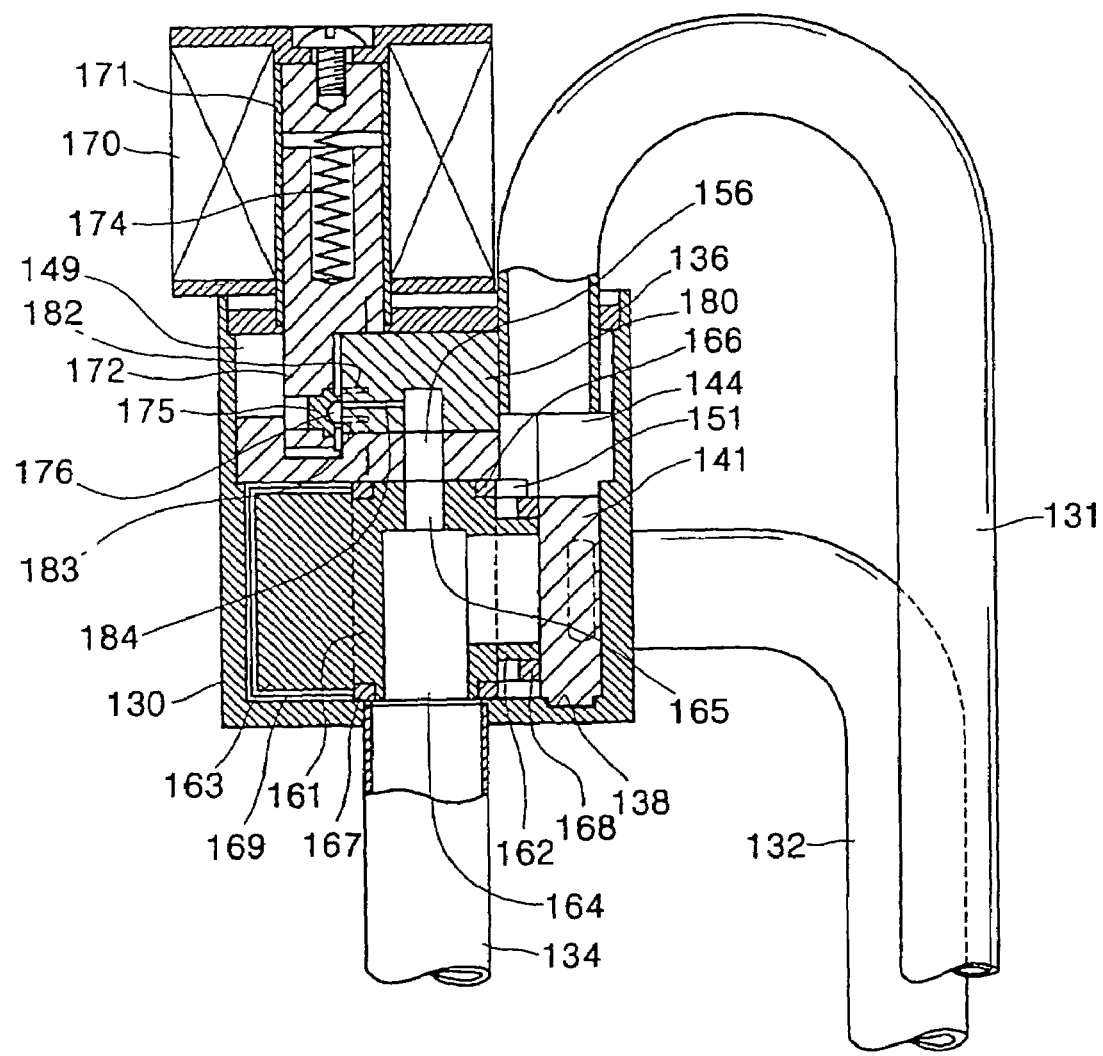
FIG. 20 is a vertical sectional view illustrating the inner structure of the four-way reversible valve shown in FIG. 18.

In the operation of the four-way reversible valve according to the present invention, referring to FIG. 20, most of fluid (coolant) supplied through the coolant connection pipe 131 at the side of supply port P flows into the valve room 150a through the port connection hole 51 at the supply's side. Part of the fluid flows into a space at the upper side of the flange portion 142 of the valve main body 140 along a gap provided at the inner circumferential surface of the valve casing 130 and further enters in the one side of the vane room 150b through one of the two pilot ports 182 and 183 of the valve seat block 180 exposed to the space.

Figure 21A:
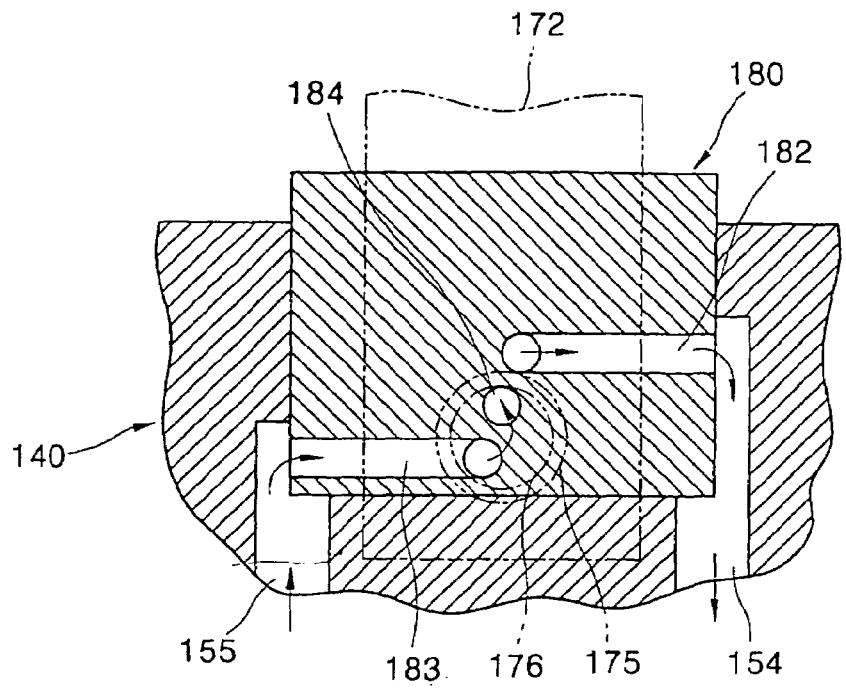
FIGS. 21A and 22B are sectional views illustrating part of the pilot control operation of the four-way reversible valve shown in FIG. 18.

When the solenoid 170 is not in an excited state, the plunger 172 protrudes downward by the spring 174 and the pilot valve cup 175 is located at the normal position on the seat surface 181 of the valve seat block 180. When the pilot valve cup 175 is positioned at the normal position, as shown in FIG. 21A, the lower two pilot ports 183 and 184 of the three pilot ports 182, 183, and 184 formed in the valve seat block 180 are connected by the pilot valve cup 175 and the uppermost pilot port 182 is exposed. Thus, part of the fluid supplied from the supply port P flows in the exposed uppermost pilot port 182 and moves toward the vane room 150b through the vane port 154 at one side connected thereto.

The fluid input to the vane room 150b through the vane port 154 at one side applies pressure to the vane portion 163 of the vaned spool 160 from the fixed vane 157 at one side toward the fixed vane 58 at the other side, so that the entire vaned spool 160 rotates clockwise.

Figure 22A:
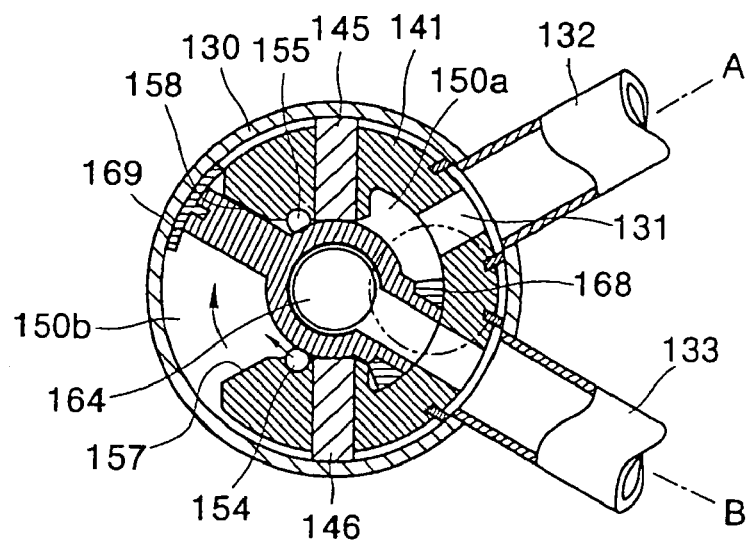

When the vaned spool 160 is rotated clockwise, as shown FIG. 22A, the load port A at one side of the two load ports A and B is connected to the supply port P via the valve room 150a. Also, the load port B at the other side is connected to the drain port R via the groove 164 of the vaned spool 160. Thus, the air conditioning system is set to perform a cooling operation.

In the meantime, during the clockwise rotation of the vaned spool 160, the fluid remaining in the clockwise direction of the vane portion 163 in the vane room 150b is exhausted through the vane port 155 at the other side formed in the vaned spool 160. As shown in FIG. 21A, the remaining fluid proceeds via the pilot port 183 connected to the vane port 155, the pilot valve cup 175, and the pilot port 184. Then, as shown in FIG. 20, the fluid sequentially passes the drain hole 156 of the valve main body 140 and the drain hole 165 of the vaned spool 160, and is guided toward the groove 164 of the vaned spool 160 and is drained through the drain port R connected to the groove 164.

Figure 21B:
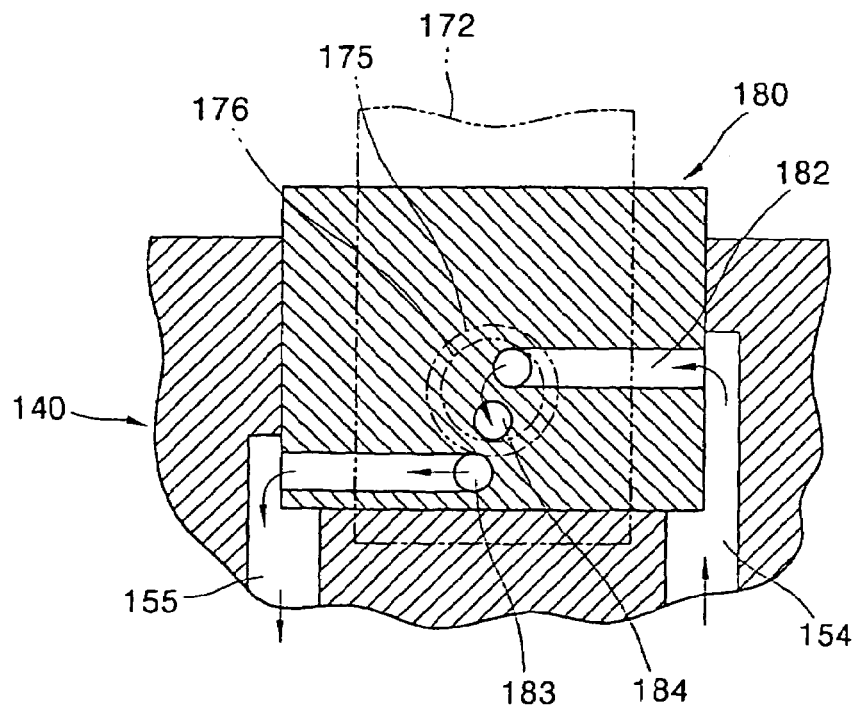

Next, when the solenoid 170 is excited, the plunger 172 is pulled upward by an electrical thrust according to the excitation of the solenoid 170. Here, as shown in FIG. 21B, the pilot valve cup 175 is located at the converting position on the seat surface 181 of the valve seat block 180. When the pilot valve cup 175 is positioned at the converting position, the upper two pilot ports 182 and 184 of the three pilot ports 182, 183, and 184 formed in the valve seat block 180 are connected by the pilot valve cup 175 and the lowermost pilot port 183 is exposed. Thus, part of the fluid supplied from the supply port P flows in the exposed lowermost pilot port 183 and moves toward the other side of the vane room 150*b* through the vane port 155 connected thereto.

The fluid input to the vane room 150*b* through the vane port 155 at the other side applies pressure to the vane portion 163 of the vaned spool 160 from the fixed vane 157 at the other side toward the fixed vane 58 at one side, so that the entire vaned spool 160 rotates counterclockwise.

Figure 22B:
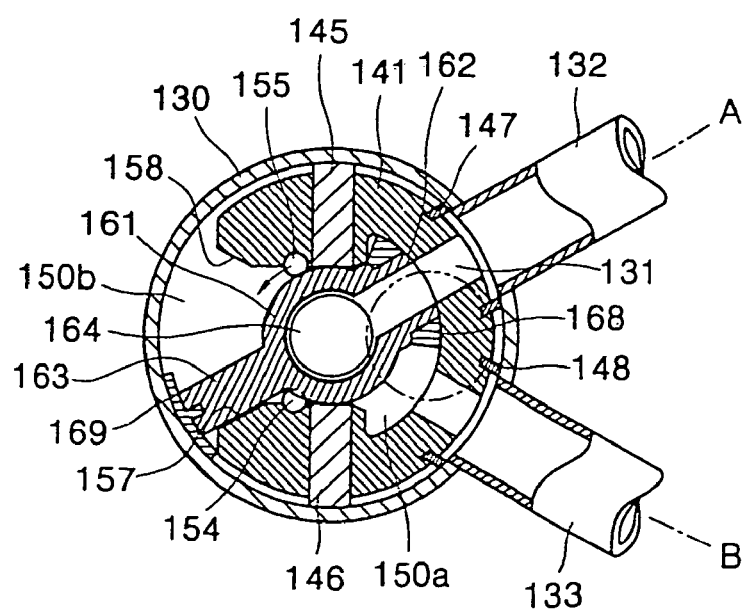

When the vaned spool 160 is rotated counterclockwise, as shown FIG. 22B, the load port B at the other side of the two load ports A and B is connected to the supply port P through the valve room 150*a*. Also, the load port A at one side is connected to the drain port R through the groove 164 of the vaned spool 160. Thus, the air conditioning system is set to perform a heating operation.

In the meantime, during the counterclockwise rotation of the vaned spool 160, the fluid remaining in the counterclockwise direction of the vane portion 163 in the vane room 150*b* is exhausted through the vane port 154 at one side formed therein. As shown in FIG. 21A, the remaining fluid proceeds via the pilot port 182 connected to the vane port 154, the pilot valve cup 175, and the pilot port 184. Then, as shown in FIG. 20, the fluid sequentially passes the drain hole 156 of the valve main body 140 and the drain hole 165 of the vaned spool 160, and is guided toward the groove 164 of the vaned spool 160 and then drained through the drain port R connected to the groove 164.

As described above, the present invention disclosed a vaned spool type which is a new type of a directional control valve and an application thereof. The vaned spool type has a structure that combines the conventional rotary spool type and slide spool type. Thus, since the main port is switched with a single valve portion of the vaned spool, the number of leakage points is reduced. That is, a degree of processing should not be high and thus the directional control valve can be made by injection molding synthetic resin, which is advantageous for mass production and distribution at a low cost. The vaned spool type using a pilot operated method has a quick switching and is appropriate for a large amount of fluid. In particular, since the pilot valve like a solenoid control valve in the internal pilot type can be incorporated into the valve main body, the present direction control valve is very advantageous for miniaturization. In addition, since the present directional control valve can be used as an air pressure use and an oil hydraulic use, applicability thereof is very high. Furthermore, since, as the internal pilot type, the pilot valve can be configured into one body with the valve main body, the present directional control valve is very advantageous in miniaturization.

In the meantime, in the four-way reversible valve for a cooling cycle using the vaned spool type directional control valve according to the present invention, since the pilot valve of an internal pilot type is incorporated into the valve main body in the casing, only a connection pipe corresponding to the main port is needed to be welded to the valve casing. Thus, the number of welding points can be minimized so that manufacture of the four-way reversible valve is made easy. Also, the rate of defectiveness due to inferior welding can be remarkably reduced.

What is claimed is:

1. A vaned spool type directional control valve comprising:
   a vaned spool including a spool shaft, a valve portion extending from one side of the spool shaft, a vane portion extending from the other side of the spool shaft, and a groove penetrating the spool shaft and the valve portion; and
   a valve main body including:
   a chamber including a shaft support portion rotatably supporting the spool shaft, a valve room extending from one side of the shaft support portion and accommodating the valve portion of the vaned spool so that the valve portion rotates and moves in a sealed state, and a vane room extending from the other side of the shaft support portion and accommodating the vane portion of the vaned spool so that the vane portion rotates and moves in a sealed state;
   a plurality of main ports through which fluid passes via the valve room of the chamber; and
   two vane ports through which pilot fluid passes formed at the opposite sides of the vane room of the chamber,
   wherein the vaned spool is rotated by pressure of the pilot fluid passing through the vane ports and two of the main ports are connected with each other via the groove according to the position of the valve portion of the vaned spool.

2. The valve as claimed in claim 1, wherein the valve main body comprises the chamber and the chamber comprises a main body block having an open upper side and a main body cover covering the main block to seal the chamber.

3. The valve as claimed in claim 1, wherein the plurality of main ports includes a supply port supplying fluid to the valve room in the chamber, two load ports circulating the fluid supplied to the valve room to the outside, and an exhaust port exhausting the fluid from one of the two load ports, and one of the two load ports is connected to the exhaust port via the groove according to the position of the valve portion of the vaned spool.

4. The valve as claimed in claim 1, wherein the vaned spool is coated to maintain a seal with respect to respective members in the chamber.

5. A vaned spool type directional control valve comprising:
   a vaned spool including a spool shaft, a valve portion extending from one side of the spool shaft, a vane portion extending from the other side of the spool shaft, and a groove penetrating the spool shaft and the valve portion;
   a valve main body including:
   a chamber including a shaft support portion rotatably supporting the spool shaft, a valve room extending from one side of the shaft support portion and accommodating the valve portion of the vaned spool so that the valve portion rotates and moves in a sealed state, and a vane room extending from the other side of the shaft support portion and accommodating the vane portion of the vaned spool so that the vane portion rotates and moves in a sealed state;
   a plurality of main ports through which fluid passes via the valve room of the chamber; and
   two vane ports through which pilot fluid passes formed at the opposite sides of the vane room of the chamber; and
   a pilot valve unit taking some of fluid supplied from one of the main ports and changing flow of the fluid with respect to the vane port,
   wherein two of the main ports are connected with each other through the groove according to the position of the valve portion of the vaned spool.

6. The valve as claimed in claim 5, wherein the valve main body comprises the chamber and the chamber comprises a main body block having an open upper side, a main body cover covering an upper surface of the main block to seal the chamber, and a pilot bracket coupled to a lower surface of the main body block and supporting the pilot valve unit.

7. The valve as claimed in claim 5, wherein the plurality of main ports includes a supply port supplying fluid to the valve room in the chamber, two load ports circulating the fluid supplied to the valve room to the outside, and an exhaust port exhausting the fluid from one of the two load ports and one of the two load ports is connected to the exhaust port via the groove according to the position of the valve portion of the vaned spool.

8. The valve as claimed in claim 5, wherein the vaned spool is coated to maintain a seal with respect to respective members in the chamber.

9. The valve as claimed in claim 5, wherein the pilot valve unit comprises a pilot valve room formed in the valve main body which is fluidly connected to the valve room and includes a hole through which the fluid is exhausted to the outside, a pilot valve cup accommodated in the pilot valve room and moving between two positions where one of the two vane ports is selected and connected to the hole, and a solenoid mechanism operated by an electric signal to reciprocate the pilot valve cup.

10. The valve as claimed in claim 9, wherein the pilot valve unit further comprises a valve seat block installed in the pilot valve room of the valve main body, providing a flat valve seat surface for the movement of the pilot valve cup, and having three pilot ports open on the valve seat surface and connected to the two vane ports and the hole.

11. The valve as claimed in claim 5, wherein the pilot valve unit comprises two pilot valve rooms formed at two positions in the valve main body, which are fluidly connected to the valve room and include a hole through which the fluid is exhausted to the outside, two pilot valve cups accommodated in the pilot valve rooms and moving between two positions where the hole is blocked or the respective two vane ports are connected to the hole, and two solenoid mechanisms respectively operated by an electric signal to make the pilot valve cups alternately reciprocate.

12. A vaned spool type directional control valve comprising:
 a vaned spool including a spool shaft, a valve portion extending from one side of the spool shaft, a vane portion extending from the other side of the spool shaft, and a groove penetrating the spool shaft and the valve portion;
 a valve main body including:
  a chamber including a shaft support portion rotatably supporting the spool shaft, a valve room extending from one side of the shaft support portion and accommodating the valve portion of the vaned spool so that the valve portion rotates and moves in a sealed state, and a vane room extending from the other side of the shaft support portion and accommodating the vane portion of the vaned spool so that the vane portion rotates and moves in a sealed state;
  a plurality of main port connection holes through which fluid passes via the valve room of the chamber; and
  two vane ports through which pilot fluid passes formed at the opposite sides of the vane room of the chamber;
 a valve casing accommodating the valve main body in a fixed state, forming a seal, and having a plurality of main ports connected to the main port connection holes and a plurality of refrigerant connection pipes for the connection of refrigerant pipes corresponding to the main ports; and
 a pilot valve unit taking some of the refrigerant supplied from one of the main ports and changing flow of the refrigerant with respect to the vane port,
 wherein two of the main ports are connected with each other via the groove according to the position of the valve portion of the vaned spool.

13. The valve as claimed in claim 12, wherein the valve casing has a cup shape having an open upper side and comprises a cap covering the upper end of the valve casing to form a seal.

14. The valve as claimed in claim 12, wherein the valve main body comprises a cylindrical body portion and a flange portion above the body portion, and the whole chamber is open at a lower surface of the cylindrical body portion and encompassed by a bottom surface and inner circumferential surface of the valve casing while an outer wall surface of the vane room of the chamber is open.

15. The valve as claimed in claim 12, further comprising a sealing member to form a seal between the respective members of the vaned spool and the respective members in the chamber of the valve main body.

16. The valve as claimed in claim 12, wherein the pilot valve unit comprises a pilot valve room formed in the valve main body which is fluidly connected to the valve room and includes a hole through which the refrigerant is drained to the outside, a pilot valve cup accommodated in the pilot valve room and moving between two positions where one of the two vane ports is selected and connected to the hole, and a solenoid mechanism operated by an electric signal to reciprocate the pilot valve cup.

17. The valve as claimed in claim 16, wherein the pilot valve unit further comprises a valve seat block installed in the pilot valve room of the valve main body, providing a flat valve seat surface for the movement of the pilot valve cup, and having three pilot ports open on the valve seat surface and connected to the two vane ports and the hole.

18. The valve as claimed in claim 3, wherein the vaned spool is coated to maintain a seal with respect to respective members in the chamber.

19. The valve as claimed in claim 7, wherein the vaned spool is coated to maintain a seal with respect to respective members in the chamber.

* * * * *